J. O'HARE.
NUT LOCK.
APPLICATION FILED DEC. 16, 1912.
1,061,776.
Patented May 13, 1913.
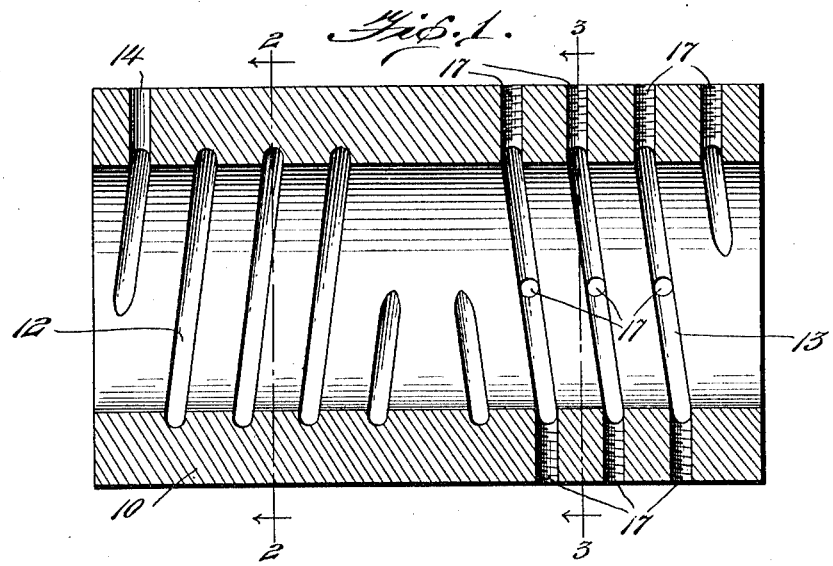
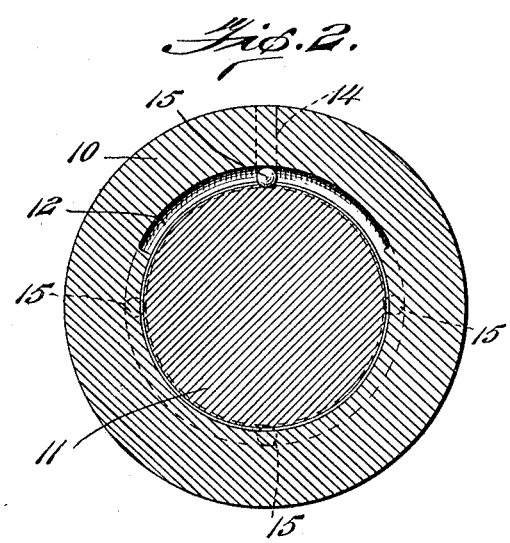
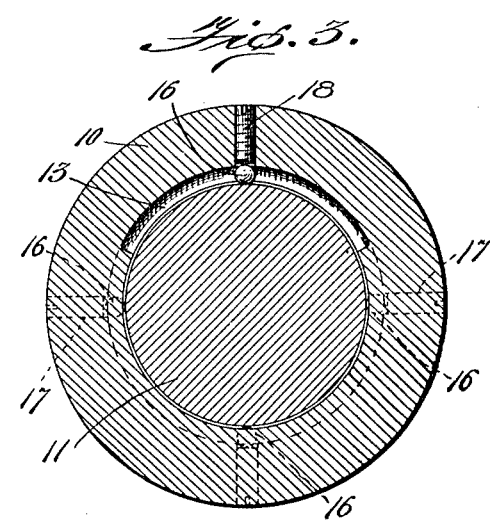

UNITED STATES PATENT OFFICE.

JAMES O'HARE, OF WASHINGTON, INDIANA.

NUT-LOCK.

1,061,776.  Specification of Letters Patent.  Patented May 13, 1913.

Application filed December 16, 1912. Serial No. 737,042.

*To all whom it may concern:*

Be it known that I, JAMES O'HARE, a citizen of the United States, residing at Washington, county of Daviess, State of Indiana, have invented certain new and useful Improvements in Nut-Locks, of which the following is a specification.

This invention relates to nut locks and means for securing a sleeve on a cylindrical rod or bolt.

One of the objects of the invention is to provide an improved device of this character adapted to be applied to a rod of uniform diameter at an intermediate point thereon, so as to avoid the use of screw threads. It is frequently impracticable to employ the ordinary screw threads for securing a nut or collar in position on a rod because of the necessity of extending the threads to the end of the rod when the latter is of uniform diameter throughout its length.

Another object of the invention is to provide a device of this character which is adapted to be accurately placed in position on the rod, and when so placed to be secured against turning and axial movement.

Other objects and the features of novelty will be apparent from the following description taken in connection with the accompanying drawings, in which:

Figure 1 is a longitudinal section of a sleeve or nut embodying my invention. Fig. 2 is a transverse section on the line 2—2 of Fig. 1. Fig. 3 is a transverse section on the line 3—3 of Fig. 1.

Referring to Figs. 2 and 3 it will be observed that the sleeve 10 is shown in position on a rod 11. I have omitted the rod from Fig. 1 for the purpose of more clearly illustrating the invention, and it will be observed from this figure that the interior of the sleeve is provided with the helical grooves 12 and 13 arranged at opposite ends thereof, the groove 12 being right-handed and the groove 13 being left-handed.

The sleeve 10 is bored slightly larger than the diameter of the rod 11, say one thirty-second of an inch, and an opening 14 extends from the outer surface of the sleeve to one of the grooves. The grooves are preferably of uniform depth and in a practical embodiment of the invention this depth may be one-eighth of an inch. Balls 15 are inserted through the opening 14 after the sleeve has been placed on the rod. In securing the sleeve in position it will ordinarily be set out a slight distance at one side of the final position in which it is desired to be secured and a ball inserted in the opening 14 and the sleeve rotated a quarter of a revolution. A second ball is then inserted and the sleeve rotated another quarter of a revolution, this operation being repeated until the desired number of balls have been inserted. The balls are preferably slightly larger in diameter than the depth of the grooves and in the construction illustrated may be five thirty-seconds of an inch in diameter so that as the sleeve is rotated on the rod the balls will indent a groove in the rod which will prevent the sleeve from moving axially. The helical arrangement of the grooves will cause the sleeve to advance axially as it is rotated, thus permitting the sleeve to be accurately placed.

When the sleeve has been arranged in the desired position balls 16 are inserted in the opening 17 which extend from the exterior of the sleeve to the groove 13. The openings 17 are preferably arranged at various points on the circumference of the sleeve to provide a uniform distribution of the balls. After the balls 16 have been placed in position suitable plugs 18 are screwed or driven into the openings 17 for the purpose of retaining the balls. As in the case of the balls 15, the balls 16 are slightly larger in diameter than the depth of the groove 13 so that in the event of the sleeve 10 being turned on the rod 11 the balls would be caused to indent the rod and since the groove 13 is pitched in the opposite direction to the groove 12 one set of balls would tend to move the sleeve in one direction, axially, and the other set would tend to move the sleeve in opposition to the first set, and thereby securely lock the sleeve against rotation. It will be obvious that the sleeve 10 may be used as a nut or a thrust collar on a shaft and that in either case the sleeve will be securely locked against either turning or axial movement.

While I have illustrated and described the groove 13 as being pitched in the opposite direction from the groove 12 it will be readily understood that the device will also be effective with the groove 13 pitched at other angles, the essential feature being to have the pitch of the groove 13 different from the pitch of the groove 12.

It will be obvious to those skilled in the art that other changes may be made in the minor details of the invention, within the scope of the appended claims, and therefore I do not wish to be limited to the exact details shown and described.

Having thus described the invention what is claimed as new is:

1. A new article of manufacture consisting of a sleeve having internal grooves pitched at different angles to the axis of the sleeve, and openings extending from the outer surface of the sleeve to said grooves, for the purpose described.

2. A new article of manufacture consisting of a sleeve having internal helical grooves oppositely pitched, and openings extending from the outer surface of the sleeve to said grooves, for the purpose described.

3. A device of the class described comprising, in combination, a cylindrical rod, a sleeve arranged on said rod, said sleeve being provided with internal grooves of substantially uniform depth, pitched at different angles to the axis of the sleeve, and openings extending from the outer surface of the sleeve to said grooves, and balls arranged in said grooves and engaging said rod at different points around the circumference thereof.

4. A device of the class described comprising, in combination, a cylindrical rod, a sleeve arranged on said rod, said sleeve being provided with internal helical grooves, pitched in opposite directions, and openings extending from the outer surface of the sleeve to said grooves, and balls arranged in said grooves and engaging said rod at different points around the circumference thereof, said balls being slightly larger in diameter than the average distance between the surface of the rod and the bottom of the grooves.

5. A device of the class described comprising, in combination, a cylindrical rod, a sleeve arranged on said rod, said sleeve being provided with internal helical grooves, pitched in opposite directions, and an opening extending from the outer surface of the sleeve to one of said grooves, and a plurality of such openings extending to the other of said grooves, balls arranged in the former of said grooves at varying distances from the opening thereto, and balls arranged in the latter of said grooves adjacent the openings thereto, and closures in the latter openings adapted to prevent the escape of the balls.

In testimony whereof I affix my signature in presence of two witnesses.

JAMES O'HARE.

Witnesses:
F. A. SEAL,
E. H. HOFFMANN.

---

Copies of this patent may be obtained for five cents each, by addressing the "Commissioner of Patents, Washington, D. C."